Z. A. BRUEGGER.
ENGINE PISTON.
APPLICATION FILED FEB. 2, 1920.
1,395,794.
Patented Nov. 1, 1921.
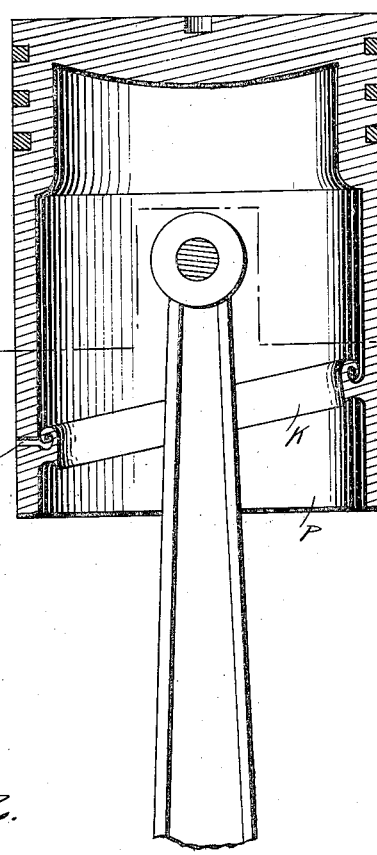
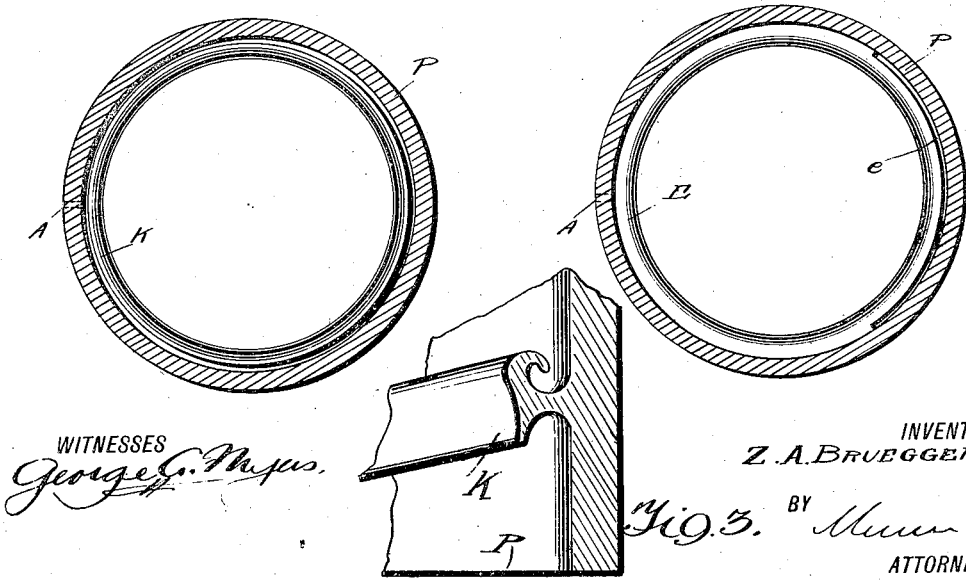
WITNESSES
INVENTOR
Z. A. BRUEGGER,
BY
ATTORNEYS

UNITED STATES PATENT OFFICE.

ZENO ARNO BRUEGGER, OF BOISE, IDAHO.

ENGINE-PISTON.

1,395,794.  Specification of Letters Patent.  Patented Nov. 1, 1921.

Application filed February 2, 1920. Serial No. 355,891.

*To all whom it may concern:*

Be it known that I, ZENO A. BRUEGGER, a citizen of the United States, and a resident of Boise, in the county of Ada and State of Idaho, have invented certain new and useful Improvements in Engine-Pistons, of which the following is a specification.

My invention relates to lubricating systems for engines and particularly to a piston constructed to effect a predetermined distribution of oil within a cylinder.

In all internal combustion engines in which the splash system of lubrication is employed, it has been found that the crank shaft projects the oil to that side of the cylinder which is nearest the connecting rod when its corresponding crank is descending. This side of the cylinder receives the least amount of thrust and therefore the least amount of wear, the main part of the thrust being transmitted to the opposite side of the cylinder because the crank has just passed upper dead center when the explosive mixture is ignited. It is therefore evident that the side of the cylinder that should receive the greatest amount of lubrication is inadequately oiled resulting in an ununiform wear of the piston and cylinder which causes bad compression and carbonization.

It is a purpose of my invention to overcome these faults by providing one or more channels on the inner side of the piston which are formed and positioned to catch the oil as it is thrown into one side of the cylinder and to deliver the same to the opposite side thereof, thereby effecting the proper distribution of the oil and preventing uneven wear of the cylinder and piston. The channels within the piston may be formed integrally with the latter or separately and removably fitted within the piston.

I will describe two forms of pistons embodying my invention, and will then point out the novel features thereof in the claim.

In the accompanying drawings:—

Figure 1 is a view, showing in vertical section the cylinder and one form of piston embodying my invention;

Fig. 2 is a transverse sectional view, taken on the line 2—2 of Fig. 1;

Fig. 3 is an enlarged detail, sectional view of the channel shown in the preceding views; and Fig. 4 is a sectional view of a cylinder showing in top plan another form of channel embodying my invention.

Referring specifically to the drawings, in which similar reference characters designate similar parts, P designates a piston of the ordinary construction with the exception that it is provided interiorly thereof with a channel K that extends circumferentially of the piston, and is inclined downwardly to a point adjacent the lower end of the piston. The channel K at its lowest point communicates with a passage A formed in the side wall of the piston in a manner to permit communication between the channel and the contacting walls of the cylinder and piston. In the present instance, the channel K is formed by casting integral with the piston, a flange that is bent upwardly so as to dispose the open side of the channel toward the closed end of the cylinder.

In the normal operation of an engine employing the splash system of lubrication, the oil is thrown upwardly into the piston and cylinder for lubricating the contacting walls of these two elements. As the oil descends along the inner walls of the piston, it is caught within the channel K and because of the inclination of the latter, this oil gravitates to the passage A and outwardly of the piston between the contacting walls of the cylinder and piston. In this manner, the oil is delivered to that side of the piston which receives the greatest amount of thrust so that it is thoroughly lubricated at all times, thereby preventing uneven wear at this point and causing the piston to snugly fit within the cylinder at all times.

As shown in Fig. 3, the flange forming the channel K is tapered in width from its point of connection with the piston to its free edge, and is bent upwardly and inwardly in the form of a spiral in such manner as to allow of the entrance of the oil into the channel from the upper side thereof during upward movement of the piston but to prevent the same from being ejected from the channel under the action of the piston when moving downward. It will thus be seen that when once the oil is introduced into the channel it cannot escape only through the passage A.

Referring now to Fig. 4, E designates a pipe which is adapted to be secured to the inner side of the piston P so as to occupy the same plane as the channel K. As clearly shown in the drawing, a pipe E is slotted at its upper side for a portion of its length as at $e$ for the purpose of allowing the oil to enter the pipe as it is projected from the crank case to the inner side of the piston. It will thus be seen that because of the inclination of the pipe E the oil entering the same from through the slot $e$ will gravitate downwardly and exteriorly of the piston through the passage A so that uniform lubrication of the piston through the walls of the cylinder is effected as in the first form of my invention.

Although I have herein shown and described only two forms of pistons embodying my invention, it is to be understood that various changes and modifications may be resorted to without departing from the spirit of the invention or the spirit and scope of the appended claim.

Having thus described my invention, I claim:

In combination, a cylinder, a piston adapted to work therein, a flange formed interiorly of the piston and extending circumferentially thereof, said flange being inclined and bent to provide a continuous channel inclined with respect to the piston and which is adapted to trap the oil as it descends along the inner walls of the piston, said piston being formed with a passage which establishes communication between the lowest point of the channel and the outer side of the piston whereby the oil trapped in the channel is conveyed to a predetermined point exteriorly of the piston.

ZENO ARNO BRUEGGER.